United States Patent
Goss

(10) Patent No.: US 6,697,465 B1
(45) Date of Patent: Feb. 24, 2004

(54) COMPUTER-CONTROLLED HEADSET SWITCH

(75) Inventor: Raymond G. Goss, Austin, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/103,115

(22) Filed: Jun. 23, 1998

(51) Int. Cl.[7] .............................................. H04M 15/00
(52) U.S. Cl. .................... 379/93.09; 370/352; 370/353; 370/354; 370/355; 370/356; 379/93.14
(58) Field of Search ................................ 370/237, 217, 370/218, 232, 235, 236, 352, 353, 354, 355, 356; 379/93.09, 93.14, 221, 207

(56) References Cited

U.S. PATENT DOCUMENTS

| | | | | |
|---|---|---|---|---|
| 4,517,413 A | * | 5/1985 | Pavitt, Jr. .................. | 179/81 R |
| 5,337,343 A | * | 8/1994 | Stickney ...................... | 379/45 |
| 5,572,583 A | * | 11/1996 | Wheeler et al. ............ | 379/207 |
| 5,592,538 A | * | 1/1997 | Kosowsky et al. ........... | 379/93 |
| 5,694,467 A | * | 12/1997 | Young, III .................. | 379/430 |
| 5,884,032 A | * | 3/1999 | Bateman et al. ......... | 395/200.34 |
| 5,923,747 A | * | 7/1999 | Van Berkum et al. ...... | 379/267 |
| 6,046,762 A | * | 4/2000 | Sonesh et al. ................ | 348/16 |
| 6,064,653 A | * | 5/2000 | Farris .......................... | 370/237 |
| 6,091,812 A | * | 7/2000 | Iglehart et al. ............. | 379/308 |

* cited by examiner

Primary Examiner—Hassan Kizou
Assistant Examiner—Joe Logsdon

(57) ABSTRACT

A computer controlled communications switch for use at a communications center having an agent interface unit for conducting communication calls to and from an agent over both a telephone network and a computer network. The computer controlled communications switch comprises a switching unit having first and second states. When the switching unit is in the first state, the switching unit connects the agent interface unit to the telephone network, and when the switching unit is in the second state, the switch connects the agent interface unit to the computer network The switching unit is controlled by a computer including a predetermined program so that the switching unit is in the first state when a call is made to or from the agent interface unit via the telephone network, and the switching unit is in the second state when a call is made to or from the agent interface unit via the computer network.

11 Claims, 3 Drawing Sheets

COMPUTER-CONTROLLED HEADSET SWITCH

BACKGROUND OF THE INVENTION

This invention generally relates to telecommunications; and more specifically, the invention relates to communications or call centers that receive and transmit communications over both telephone and computer networks. Even more specifically, the present invention relates to a computer controlled communications switch, for use at such call centers, that automatically connects an agent to the appropriate network, either the telephone network or the computer network, depending on which network is being used to make or receive a particular communication call.

In the telecommunications industry, call centers are used to provide customer and operator services for business clients. Traditionally, customers of these business clients place a phone call to a toll-free telephone number to reach a call center customer service agent, and these agents then provide some type of service over the telephone for the customers. In many existing call centers, the service agents use telesets or automated call distribution pads to place and receive telephone calls. These telesets have headsets or handsets that the agents use to communicate with customers.

The telecommunications industry is changing; for example, more and more people are conducting business on the Internet. Internet telephony is growing in popularity and improving in quality. Some of the advantages of internet telephony include application sharing, white boarding, and the ability to make calls without a telephone.

In order for the customer service agents at call centers to also participate in voice over internet telephony, it is necessary that those agents be provided with equipment that will enable them to conduct voice communication over the internet as well as over conventional telephone networks. One way to do this is to provide the call center agents with expensive internet telephony gateways that will link the automated call distribution pads to the Internet, or the agents may use a speaker and microphone connected to personal computers. Another option is to equip the agents with a headset that will work with both their telesets and their personal computers.

Standard current amplified headsets are four wire devices. In these devices, two wires are used for the microphone, and the other two wires are for the earpiece. Typical personal computer microphones and speakers also are each a two-wire device, and it is not difficult to connect a standard headset to a personal computer. There are devices presently available that allow a single headset to work with both a personal computer and a telephone, and for example, the headset may include a switch, referred to as a PC switch, to allow the headset to communicate with a personal computer.

One disadvantage with these switches is that they are manually controlled. This may not be a significant problem for the ordinary individual that is making outbound calls on a telephone or listening to audio on a personal computer. However, in a call center environment, systems are automated and often the telephone does not even ring—calls are delivered when agents are available. Under these circumstances, it would be very confusing for the agent to have to manually switch between the personal computer and the teleset to handle internet calls and telephone network calls.

SUMMARY OF THE INVENTION

An object of this invention is to provide an improved communications switch that enables an agent to communicate both over a telephone network and over a computer network.

Another object of the present invention is to provide a communications switch that automatically connects an operator to a caller regardless of whether the call is being made over a telephone network or a computer network.

A further object of this invention is to provide a computer controlled switch for automatically switching an agent between a telephone network and a computer network, based on whether a customer contact is being made over the telephone network or the computer network.

These and other objectives are attained with a computer controlled communications switch for use at a communications center having an agent interface unit for conducting communication calls to and from an agent over both a telephone network and a computer network. The computer controlled communications switch comprises a switching unit having first and second states. When the switching unit is in the first state, the switching unit connects the agent interface unit to the telephone network, and when the switching unit is in the second state, the switch connects the agent interface unit to the computer network. The switching unit is controlled by a computer including a predetermined program so that the switching unit is in the first state when a call is made to or from the agent interface unit via the telephone network, and the switching unit is in the second state when a call is made to or from the agent interface unit via the computer network.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
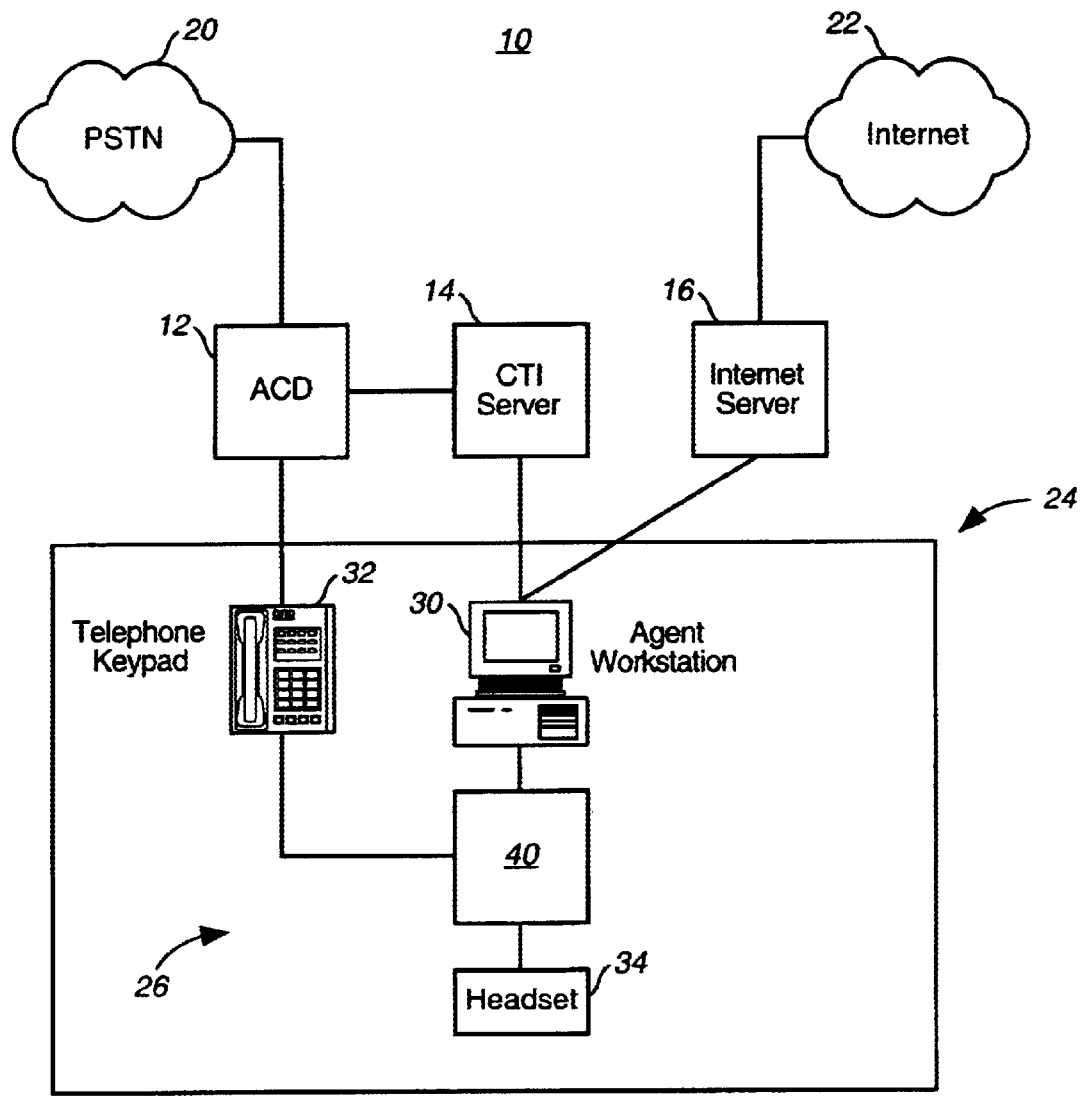
FIG. 1 shows a communications system architecture in which the present invention may be used.

FIG. 1 illustrates a simple communications system architecture 10 in which the present invention may be used. This communications architecture, which is used to process and route both contact requests and inbound calls, includes an automated call distributor (ACD) 12, a computer/telephony interface 14, an internet or web server 16, various communications networks, including the public switched telephone network (PSTN) 20 and the Internet 22, and a plurality of call centers, only one of which is shown at 24 in FIG. 1. Each call center 24 includes a multitude of agent stations, again only one of which is shown at 26 in FIG. 1; and each agent station includes an agent workstation 30, a telephone keypad 32 and a headset unit 34.

Generally, the automated call distributor 12 interfaces with the PSTN 20 for inbound and outbound calls, queries inbound calls, and distributes inbound calls among a plurality of agents. The computer/telephony interface Server 14 is connected to the automated call distributor 12 and provides event data from the call distributor to various other elements of system 10, such as the agent workstations 26. Internet server 16 supports Web sites, along with suitable software programs.

Agent workstation 30 is provided for running customer service software applications, receiving call data, and interfacing with the internet for internet protocal (IP) telephony sessions and collaborative HTTP sessions over the Web. Preferably, workstation 30 is or includes a personal computer. The teleset 32 is used for telephone calls over the PSTN 20 via the automated call distributor 12.

It should be noted that FIG. 1 shows a very simple example of a suitable communications system 10; and as will be understood by those of ordinary skill in the art, the system may be provided with additional elements or items. For example, system 10 may include an Enterprise Contact Server, an Enterprise Voice Response Unit, and an Enterprise Router, and each call center may include a Center Contact Server.

The Center Contact Server of each call center supports the agents at those centers. These servers allow customers to place contact requests to a call center by any available communication means, including the internet, and to receive contacts from an agent by any available communications means.

The Enterprise Contact Server provides enterprise-level processing and routing of contact requests. The Enterprise Contact Server communicates with each Center Contact Server and tracks the states and availabilities of agents at each call center. Each Center Contact Server sends event messages to the Enterprise Contact Server to continuously update the Enterprise Contact Server with current states and availability data. When a contact request is received, the Enterprise Contact Server can determine and select an available qualified agent among the agents at the plurality of call centers and then send the contact request to the Center Contact Server that supports the selected agent.

The Enterprise Router is a computer application that provides intelligent routing of inbound calls, and this Router can be provided in several embodiments. For example, the Router can be embodied as a distinct software application and database that resides on a computer different than the Enterprise Contact Server, or as a distinct software application and database that resides on the same computer as that Contact Server. As a further alternative, the Router can be integrated with the Enterprise Contact Server application as a process or sub-system. The preferred embodiment is to have the Enterprise Router as an application distinct from the Enterprise Contact Server, either on the same computer or different computers, and to have the Enterprise Contact Server interface with the Enterprise Router via an application program interface. This enables the use of different types and vendors' offerings of an Enterprise Router.

The Enterprise Voice Response Unit (VRU) provides interactive voice response (IVR) services for callers.

The Enterprise VRU has a voice link to the PSTN 20, rather than to a call center ACD 12. This way, the Enterprise VRU can receive calls over the PSTN, and can then route a call to any ACD 12 at any call center. One Enterprise VRU can be located with each call center 24, or one Enterprise VRU can be used for a plurality of call centers. The Enterprise VRU is connected to the Center Contact Server for the purpose of sending call data to that Contact Server.

In addition, each call center 24 may preferably include a local area network (LAN), and system 10 may include a data center. The local area network of each call center provides data connectivity among the various components of the call center. The system data center is a LAN that provides data connectivity among the Web Server and Internet, the Enterprise Contact Server, the CTI Server, and the plurality of call centers. The Data Center is connected to each call center by a wide area network (WAN) that connects the LANs of each call center. This provides a physical interface among the Enterprise Contact Server and each Center Contact Server.

To place a contact request or an inbound call, a customer may use a standard telephone connected to the PSTN 20, a personal computer (PC) with an IP telephony application connected to the Internet 22 for placing IP telephone calls, or a personal computer with a Web browser connected to the Internet for interfacing with the Web.

More detailed descriptions of call center communication systems and of their components are given in copending patent application Ser. No. 08/976,162, filed Nov. 21, 1997, now U.S. Pat. No. 6,493,447, for "Contact Server for Call Center for Syncronizing Simultaneous Telephone Calls and TCP/IP Communications", the disclosure of which is herein incorporated by reference.

Figure 2:
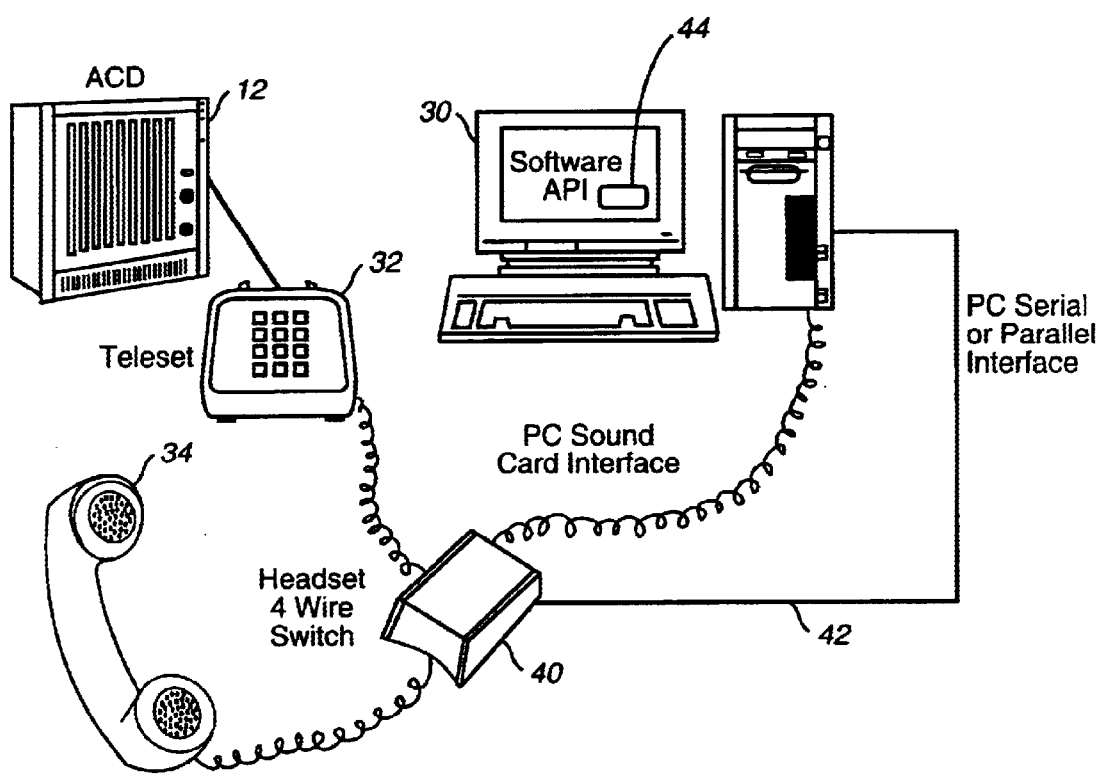
FIG. 2 illustrates a computer controlled headset switch embodying teachings of the present invention.
Figure 3:
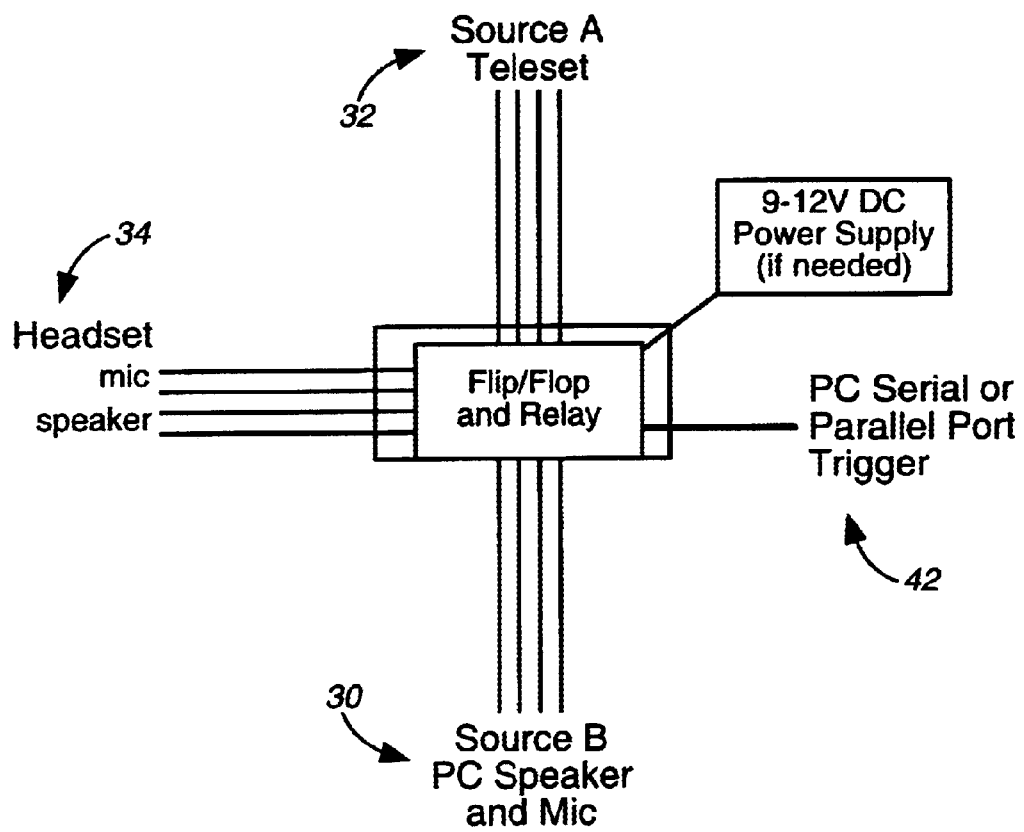
FIG. 3 is a schematic representation of the computer controlled headset switch.

With reference to FIGS. 2 and 3, the agents at the call centers 24 are provided with a computer controlled headset switch 40 to enable them to use the same headset for both voice over internet telephony and PSTN communications. This switch 40 has a serial or parallel interface 42 to the agent's personal computer 30, and this personal computer controls the switch via an application program interface (API) 44 that sends signals across the interface. Software programs, using this API, switch the agent's headset to the appropriate device. For instance, a screen pop application receiving an inbound PSTN call may be used to ensure automatically that the agent was using the ACD teleset 32. Likewise, the screen pop application may be used to switch the headset to a personal computer sound card when the application needs to make an outbound voice over the IP connection.

The application program interface 44 for the headset switch 40 can be very simple, or it may provide some additional logic. A very simple function simply toggles the switch between the telephone and the personal computer connection. This may be very suitable for a switch that controls only two devices and a software package that keeps the state of the devices and a memory.

Switch 40 may also be configured to work with more than two devices, such as a standard telephone, an ACD pad, and a personal computer. A manual override means may be provided to enable the agent to override the computer and manually switch the device.

For instance, at least one of two types of overrides may be used. One is a physical relay toggle on the hardware switch and the second is enabled in the software. The agent can use the physical switch if the PC stopped responding or had an application failure. The software override allows the agent to toggle the device via the installed API in case the "automated" logic in the screen pop application were to put the switch in the incorrect state.

Several other functions may be useful and used with switch 40. For instance, one useful function, especially if the interface is a bi-directional interface 42, is for the switch to return to the computer 30 the current state of the switch. The API may also receive input from the switch as well as the application, notifying the screen-pop application.

Additionally, callback functions may be provided to return a device number, to void a callback function, or to call a specified function when the device changes. An internal trigger on the switch 40 may also be used to update the current state of the switch. Functions may also be used to increase or decrease the volume of the switch input or output, or to void any such volume adjust functions. Many other functions will be apparent to those of ordinary skill in the art and may be used in the operation of this invention.

As mentioned above, preferably the agent's personal computer 30 controls the headset switch 40 via an application program interface that toggles the switch by sending signals to the switch. This API, in turn, is triggered by a process, to determine to toggle the switch, for example from voice call via the ACD to IP telephony call via the internet. There are numerous methods to do this.

For example, in the system architecture described above, the agent workstation is a client to the Center Contact Server. The agent workstation receives a message from the Contact Server indicating if an inbound call is being routed to the agent and whether that call is inbound from the PSTN via the ACD or from the internet. This message, when received, may be used to cause the agent workstation application to trigger the API appropriately. As will be understood by those of ordinary skill in the art, the Contact Server is not necessary to the practice of this invention.

As another example, the headset switch 40 could be set to internet calls by default, and toggled to PSTN calls when a PSTN call is received. This may be done with a message sent by the CTI Server to the agent work station, as is done when the ACD routes a PSTN call to that agent.

A sensing mechanism may be provided to determine how the actual call arrives. For example, this sensing mechanism may measure the change in current/voltage carried across the lines. This may also be done by listening for the ring.

Also, most agent workstation applications allow the agent to select a screen option for receiving an inbound call or placing an outbound call. This selection may be used to trigger the API to toggle the headset switch accordingly, based on the type of call being received or placed. In a similar manner, a screen option can be presented by the agent workstation application that enables the agent to directly trigger the API—that is, the option is to switch the headset to PSTN or to Internet mode. The agent's selection, in turn, triggers the API to toggle the headset switch accordingly.

One additional use of this invention is the prompting of VRU gathered information and/or audible screen-pop information.

Normally when a call arrives on an ACD the agent is presented a "whisper tone" message announcing the company, division, or name of the caller as the call arrives. The whisper is sent by the ACD based on the original 800 number. With some network routing products the original 800 number is lost. The ACD cannot provide a useful whisper tone. A pre-recorded wa or other audio files can be used to play the message to the agent based on the same information that is used by a screen-pop such as ANI, DNIS, or Caller Entered Digits (CED) and present this audio message to the agent via the computer as the call arrives. This would not be limited to inbound calls. Voice messages can be played back from voicemail, or from recordings gathered from the requester (caller) on the web.

The headset switch could first present the voice message (on the PC) then switch the headset to the actual caller (ACD pad). Only the agent would hear this voice message. The Contact Server provides the appropriate "data" to the screen-pop application and delays the call from being sent to the agent until after the voice message has been played.

The present invention has many uses in addition to those specifically discussed above. For instance, the invention can switch the wires of the headset/receiver, PC speaker and microphone, teleset/ACD Pad headset, or any speaker-microphone. With a suitable hookup to an amplifier, the invention allows remote control of the input and output volumes. In addition, the invention can be turned around and used with a single telephone or PC. For example, the invention may be used with a single phone that has a headset and a handset connected to it. This could even be used for calls that are on hold. Different hold music channels can be sent to the listener.

It should also be noted that the switch of this invention can be modified to support other wiring configurations. For instance, a headset (used with cordless phones and cell phones) may have one microphone and one speaker but uses only three wires. Normally, a speaker needs a receiving wire and a wire connected to an electrical ground. The microphone will have a sending wire and a connection to an electrical ground (GND). A three wire device simply shares a common GND wire.

Suitable modifications may also be made for stereo wiring. Stereo speakers need two separate conducting signal wires and a common (or separate) GND.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A communications switch, comprising:
   a first interface connecting the communications switch to a headset;
   a second interface connecting the cations switch to a teleset;
   a third interface connecting the communications switch to a workstation;
   a fourth interface receiving a control sign generated from a program executing on the workstation; and
   a switch operating in one of a first state for coupling the headset and the teleset and a second state for coupling the headset and the workstation in response to the control signal received from the workstation.

2. The communications switch according to claim 1, further comprising a manual override for forcing the switch into one of the first state and the second state.

3. The communications switch according to claim 1, wherein the switch is toggled in response to a software override.

4. The communications switch according to claim 1, wherein the fourth interface includes a bi-directional interface for providing a signal indicating a current state of the switch to the workstation.

5. The communications switch according to claim 1, wherein the workstation is configured to support IP (intern Protocol) telephony.

6. The communications switch according to claim 1, wherein the control signal is generated from a program executing on the workstation.

7. A communications apparatus for enabling an agent to selectively communicate over both a telephone network and a computer network, comprising:
   a workstation coupled to a telephony server, and
   a communications switch having:
     a first interface connecting the communications switch to a headset,
     a second interface connecting the communications switch to a teleset,
     a third interface connecting the communications switch to die workstation, a fourth interface receiving a control signal from the workstation, and a switch operating in one of a first state for coupling the headset and the teleset and a second state for coupling the headset and the workstation in response to the control signal received from the workstation.

8. The communications apparatus according to claim 7, wherein the workstation includes an input device and the workstation is configured, in response to input received from the input device, to output the control sign to cause the switch to operate in one of the first state and the second state.

9. The communications apparatus according to claim 8, workstation is further configured, in response to input received from the input device, to output the control signal to cause the switch to operate in the first state when a call is made via the teleset and to cause the switch to operate in the second state when a call is made via the workstation.

10. The communications apparatus according to claim 7, wherein the workstation is configured, in response to a signal received from the telephony server indicating whether an incoming call is coming from a telephone network or a computer network, to output the control signal to cause the switch to operate in one of the first state and the second state.

11. The communications switch according to claim 7, wherein the telephony server includes a computer-telephony interface server.

\* \* \* \* \*